Patented May 20, 1930

1,759,154

UNITED STATES PATENT OFFICE

CARLETON ELLIS, OF MONTCLAIR, NEW JERSEY, ASSIGNOR TO CHADELOID CHEMICAL COMPANY, OF NEW YORK, N. Y., A CORPORATION OF WEST VIRGINIA

PAINT AND VARNISH REMOVER AND PROCESS OF MAKING SAME

No Drawing.   Application filed January 11, 1926.  Serial No. 80,631.

This invention relates to paint and varnish removers and to their preparation, and relates especially to compositions containing acetone, secondary propyl alcohol, a hydrocarbon, or a mixture of hydrocarbons and a small proportion of a mineral wax, or other waxy substance effective as a retardant of evaporation. The composition also may contain, in some cases, a protective colloid for the wax, such for example as a minute percentage of nitrocellulose or soap and in some cases the former may be present in larger proportion to serve as an agent to give body to the remover rendering it to a greater or less extent of a syrupy consistency. Furthermore, soap may be used in larger quantities to assist in removal of traces of wax from the cleaned surface on which the remover has been used to soften an old coat of paint or varnish.

It is desired to have the wax in a highly colloidal condition while at the same time employing preferably a major proportion of a wax precipitant in order to keep down to as low a percentage as possible the wax required to form an evaporation retarding film. In the preferred form of the invention the wax precipitant is a mixture of isopropyl alcohol and acetone with or without tertiary butyl alcohol.

It is customary to use fifty to sixty per cent of wax solvent hydrocarbons, e. g., benzol, in making waxy bodied removers. This calls for a larger proportion of wax, as the more wax solvent present, the greater the amount of wax required to form the desired evaporation retarding film. A high proportion of wax is sometimes undesirable as it tends to leave a greasy surface affecting the adhesion of lacquer or lacquer enamels which may be subsequently applied.

The present invention is concerned with two forms of the remover; one containing fifty per cent or more of wax precipitant, and the other containing less than fifty per cent. By using sixty to eighty per cent by volume of the wax precipitant, the percentage of wax remaining in solution is cut down to a measurable extent, and furthermore, such a composition makes a better remover for softening certain coatings, for example, shellac or lacquer enamel.

In preparing the wax precipitant the acetone and isopropyl alcohol, with or without tertiary butyl alcohol, simply may be mixed together. In this instance I may use approximately equal parts of acetone and isopropyl alcohol. The latter, by the way, may be the constant boiling composition with water containing about ninety-one per cent of the alcohol, and in some cases, from three to seven per cent of tertiary butyl alcohol. The wax precipitant mixture may contain from ten or twenty per cent of acetone up to fifty per cent or even higher. A wax precipitant may be made by cracking commercial secondary propyl alcohol, e. g., by passing through a heated copper tube at a temperature of 600–700° C. Tertiary butyl alcohol, if present, is usually destroyed or partly converted into butylene and partly into acetone under these conditions. The cracking effect is enhanced by passing the alcohol vapors over finely-divided copper or copper gauze at a temperature between 500 and 700° C. Ordinarily I prefer to use (for the cracking step) the isopropyl alcohol of ninety-one per cent strength, and if tertiary butyl alcohol is present and is broken down, a certain amount of water may be formed. In any event, in this way a wax precipitant is obtained containing say, from twenty to forty per cent of acetone, and considerably over 50% of isopropyl alcohol together with smaller amounts of other materials. The precipitant at this stage, however, contains too large a proportion of water to be desirable, and I have observed that a good part of the water may be separated by the addition of a hydrocarbon such as benzol. On adding two volumes of benzol to three volumes of the cracked composition a certain proportion of the water readily separates into small globules quickly collecting on the bottom. On adding three parts of benzol to two parts of the cracked composition turbidity ensues and the water settles out quite slowly so that it is desirable to allow the mixture to stand over-night before decanting or withdrawing the layer of water at the bottom.

Usually this method of water separation renders the mixture sufficiently free from water so that when wax is incorporated a removing composition is obtained which is adequate in its cutting speed. Further drying may, however, be secured by shaking with various desiccating agents.

The wax, which preferably is paraffin, although sometimes ceresin wax or other waxes may be used, is incorporated ordinarily merely by digesting it with the mixture of wax solvent and wax precipitant. If the mixture containing undissolved wax is warmed gently the wax will dissolve and on cooling to room temperature a sufficient part of it becomes colloided to make a good film forming basis.

The wax protective colloid may be added at this stage, e. g., one-fourth of one per cent of soluble cotton or celluloid, bearing in mind that enough acetone must be present to cause the nitrocellulose to dissolve. Dry potassium or sodium stearate, palmitate, oleate or other soap may be dissolved in like manner.

By increasing the percentage of celluloid or other nitrocellulose material to say, three or four per cent, a more syrupy body is obtained, which is sometimes desirable. Soap in an amount equal to the wax, and preferably in excess, for example, twice the weight of the wax, may be present for the purpose of minimizing any greasiness of the final cleaned surface.

The most effective hydrocarbon is benzol, but toluol or xylol and similar homologues may be employed in some cases, or mixtures of these. Various other cyclic and aromatic compounds, naphthenes, paraffins, olefins, or mixtures of these of the requisite boiling point or boiling point range may be used in some cases. Preferably a boiling point or boiling point range below 125° C., is desirable, although in some instances, a higher boiling point or boiling point range, say up to 200° C., is feasible.

A more definite formula illustrative of the present invention is to take a wax precipitant, made for example in accordance with the foregoing and containing about thirty per cent of acetone, the balance being isopropyl alcohol with some water, and possibly a small proportion of tertiary butyl alcohol or other bodies, admixing two volumes of this precipitant with six volumes of benzol and allowing to stand. From five to ten per cent by volume of liquid consisting largely of water will collect at the bottom of the receptacle. This is withdrawn and hard paraffin wax amounting to two or three ounces per gallon of the solvent mixture is added. On gentle warming and agitating the wax dissolves and is distributed through the vehicle. The soluble cotton may be added in the form of a concentrated solution in acetone. The soap may be added as a dry finely powdered product, or it may be added in alcoholic solution. The invention is not restricted, however, to the employment of nitrocellulose, soap, or other material as a protective colloid.

A mixture of benzol, wax and isopropyl alcohol of constant boiling point strength containing eight or nine per cent of water does not furnish a composition of the requisite high cutting power, that is, the coating of paint or varnish is not penetrated and softened rapidly and effectually. Even the substitution of highly concentrated isopropyl alcohol for the ninety-one per cent alcohol gives sluggish results. By cracking the isopropyl alcohol a component of acetone is supplied and this composite (when a part at least of the water is removed) forms a wax precipitant of good softening power. A remover of this character keeps the coat of paint or varnish wet or soft for a desirably long period, in other words, the coating of remover does not dry out rapidly. The isopropyl alcohol and acetone seem to have some mutual effect in reducing the vapor tension and possibly in rendering the wax film more impervious.

In making this type of remover, therefore, preferably isopropyl alcohol is cracked partially to contain say about one-fourth to one-third its volume of acetone, in the neighborhood of an equal volume of benzol or other volatile hydrocarbon or a mixture of hydrocarbons is added, water is allowed to separate and is removed and wax is introduced. The benzol or other hydrocarbon needed as a wax solvent thus functions as water-eliminating agent for the cracked isopropyl alcohol and cooperates advantageously in the process. The steps involved in the process are thus consistent and well correlated.

What I claim is:—

1. A paint and varnish remover comprising wax, a wax precipitant containing a major proportion of isopropyl alcohol and a substantial amount of acetone, and a wax solvent comprising a volatile hydrocarbon miscible with said wax precipitant and serving as a water-eliminant.

2. A paint and varnish remover comprising wax, a wax precipitant containing a major proportion of isopropyl alcohol and a minor proportion, but not below 20% of acetone, and a wax solvent comprising a volatile hydrocarbon miscible with said wax precipitant and serving as a water-eliminant; the proportion of the wax solvent being less than the wax precipitant, whereby a minimum amount of wax is required.

3. A paint and varnish remover comprising wax, a protective colloid therefor, a wax precipitant containing a major proportion of isopropyl alcohol and a minor proportion, but not below 20% of acetone, together with wax solvent comprising a volatile hydrocarbon miscible with said wax precipitant.

4. A paint and varnish remover comprising cracked isopropyl alcohol containing about one-fourth its volume of acetone in admixture with benzol and wax.

5. A paint and varnish remover comprising cracked isopropyl alcohol, wax, and a wax solvent.

6. The process of making a paint and varnish remover which comprises passing the constant boiling point mixture of isopropyl alcohol and water, containing a few per cent of tertiary butyl alcohol, through a cracking zone whereby a substantial proportion of acetone is formed and the tertiary butyl alcohol is decomposed in part at least and water is thereby formed, adding a volatile miscible hydrocarbon to precipitate water, separating the latter and incorporating a small percentage of wax in the benzol-containing product of diminished water content.

7. A remover of the character set forth, comprising as its essential components, isopropyl alcohol, acetone, liquid aromatic hydrocarbon wax solvent of the benzol series, wax and a protective colloid for the wax, the acetone in such composition being about 6 to 40% of the whole, the acetone and isopropyl alcohol together being about 60 to 80%, the wax being in amount sufficient to give an evaporation-retarding film, the protective colloid for the wax being in amount equal to at least ¼% of the whole remover, and the total water present in the assembled constituents being well below 8%.

8. A remover of the character set forth, comprising as its essential components, isopropyl alcohol, acetone, liquid aromatic hydrocarbon wax solvent of the benzol series, wax and a protective colloid for the wax, the acetone in such composition being about 6 to 40% of the whole, the acetone isopropyl alcohol together being about 60 to 80%, the wax being in amount sufficient to give an evaporation-retarding film, the protective colloid for the wax being composed of introcellulose material and soap, each of said components being in amount at least ¼% of the whole remover, and the total water present in the assembled constituents being well below 8%.

9. A remover of the character set forth, comprising as its essential components, isopropyl alcohol, acetone, liquid aromatic hydrocarbon wax solvent of the benzol series, wax and a protective colloid for the wax, the acetone in such composition being about 6 to 40% of the whole, the acetone and isopropyl alcohol together being about 60 to 80%, the wax being in amount sufficient to give an evaporation-retarding film.

10. In making compositions of low water content suitable for use as paint and varnish removers, the herein described step which comprises adding a sufficient amount of a water-separating volatile aromatic hydrocarbon wax solvent, to a liquid containing isopropyl alcohol and acetone, as its principal components, and containing water as a minor but substantial constituent, to thereby precipitate at least a large part of the water, and separating water so precipitated, and adding a wax at any appropriate stage of the treatment.

CARLETON ELLIS.